(12) United States Patent
Hui et al.

(10) Patent No.: US 9,151,914 B2
(45) Date of Patent: Oct. 6, 2015

(54) OPTICAL COMMUNICATION SYSTEMS AND METHODS FOR MINIMIZING REFLECTIVE FEEDBACK

(71) Applicant: Avago Technologies General IP (Singapore) Pte. Ltd., Singapore (SG)

(72) Inventors: David Chak Wang Hui, Santa Clara, CA (US); Xiaozhong Wang, Cupertino, CA (US); Bing Shao, Sunnyvale, CA (US); Pengyue Wen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 276 days.

(21) Appl. No.: 13/763,417

(22) Filed: Feb. 8, 2013

(65) Prior Publication Data
US 2014/0226990 A1    Aug. 14, 2014

(51) Int. Cl.
*G02B 6/42*    (2006.01)
(52) U.S. Cl.
CPC ............ *G02B 6/4207* (2013.01); *G02B 6/4204* (2013.01); *G02B 6/4206* (2013.01)
(58) Field of Classification Search
CPC .............................. G02B 6/4204; G02B 6/4207
USPC ................. 385/14–15, 31, 33–36, 92–93
See application file for complete search history.

(56) References Cited

U.S. PATENT DOCUMENTS

| | | | |
|---|---|---|---|
| 6,822,794 B2* | 11/2004 | Coleman et al. | 359/565 |
| 6,856,460 B2* | 2/2005 | Coleman et al. | 359/565 |
| 6,961,489 B2 | 11/2005 | Cox et al. | |
| 7,139,454 B2* | 11/2006 | Cox et al. | 385/33 |
| 7,597,486 B2 | 10/2009 | Teo et al. | |
| 7,802,930 B2* | 9/2010 | Jewell et al. | 385/93 |
| 2009/0252192 A1* | 10/2009 | Jewell et al. | 372/101 |
| 2009/0296177 A1* | 12/2009 | Chen et al. | 359/34 |
| 2009/0310915 A1* | 12/2009 | Jewell et al. | 385/33 |
| 2010/0189252 A1* | 7/2010 | Jacob | 380/28 |
| 2010/0329605 A1 | 12/2010 | Graham | |
| 2012/0189252 A1* | 7/2012 | Bhagavatula et al. | 385/79 |
| 2013/0034329 A1* | 2/2013 | Tucker et al. | 385/94 |

* cited by examiner

*Primary Examiner* — Ryan Lepisto
*Assistant Examiner* — Guy Anderson (57) ABSTRACT

An optical communication system includes a transceiver with a light source, a transition lens and an optical medium. Each of the light source, the transition lens and the optical medium define a corresponding axis. The light source defines a normal launch axis. The transition lens defines an optical axis. The optical medium defines a longitudinal axis. A relative misalignment from a coaxial alignment of the corresponding axes of at least one the light source, the transition lens and the optical medium is used to reduce a back reflection incident at the light source. Such misalignments can be achieved by one or both of angular adjustments and offsets of the axes.

20 Claims, 6 Drawing Sheets

(Prior Art)

OPTICAL COMMUNICATION SYSTEMS AND METHODS FOR MINIMIZING REFLECTIVE FEEDBACK

BACKGROUND

A conventional optical communication link includes at least one optical transmitter at a first end of the link, such as a laser, one optical receiver at a second end of the link, such as a photodiode, and at least one optical waveguide interconnecting the transmitter and receiver. Such optical communication links are in wide use in today's data centers and supercomputers.

The desire for increased data throughput in data centers and supercomputers leads to the desire to further increase data rates in optical communication links. As the data rate is increased in links supported by today's optical fibers the link power budget tightens. Thus, in order to achieve reliable data signal transfers at faster data rates, one or both of source signal power must increase and signal attenuation in the optical communication link must decrease.

Figure 1:
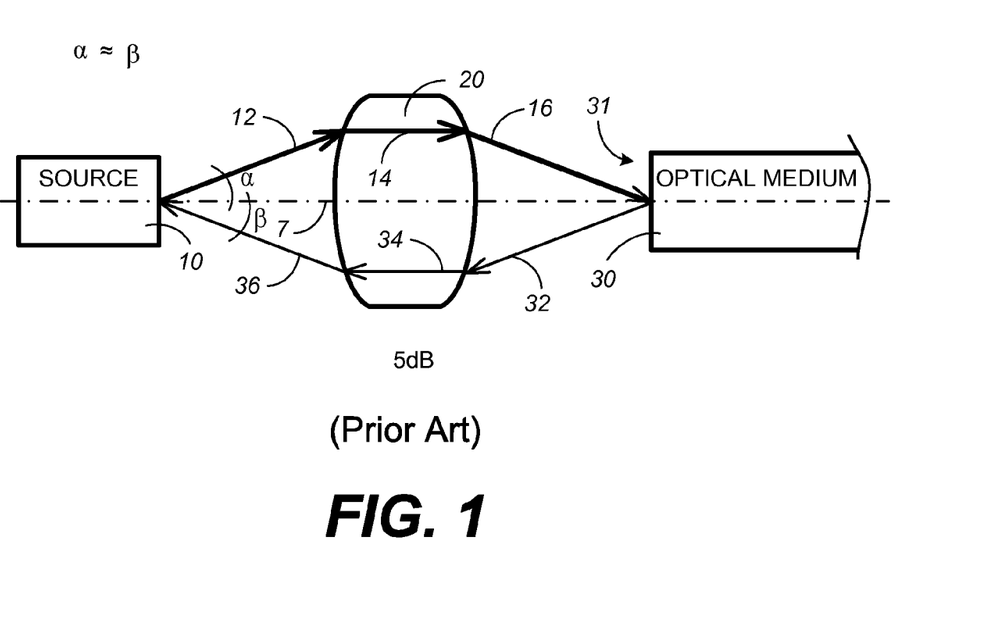
FIG. 1 is a schematic view of a conventional optical system.

However, conventional low cost optical coupler designs and source devices render it problematic to increase optical signal power and to decrease attenuation in the optical path. For example, a conventional arrangement of a source, a transition lens and an optical fiber end are illustrated in FIG. 1. To maximize coupling tolerance the source 10, transition lens 20 and optical medium 30 are arranged along a shared axis 7. The transition lens 20 is arranged with a convex surface that faces the source 10 and a convex surface that faces an end face 31 of the optical medium 30. The transition lens 20 is separated from both the source 10 and the end face 31 of the optical medium by respective air gaps. These gaps create interfaces at which there is a mismatch between indexes of refraction. Consequently, such interfaces refract or redirect an incident optical signal.

As illustrated schematically in FIG. 1, the optical signal, as represented by ray 12, is emitted from the source 10 in the direction of the transition lens 20. The ray 12 is emitted at a launch angle $\alpha$ with respect to the common axis 7. Due to the difference in the index of refraction of air and the material used to produce the transition lens 20, when the ray 12 reaches the left-facing convex surface of the transition lens 20, the ray 12 is refracted (i.e., redirected). The redirected optical signal, represented by ray 14, is further redirected when it reaches the air gap between the right-facing convex surface of transition lens 20 and the end face 31 of the optical medium 30. A portion of the twice redirected optical signal, represented by ray 16, incident at the end face 31 enters the optical medium 30, which conveys the optical signal to an opposed end of the optical medium (not shown).

As further shown schematically in FIG. 1, a remaining portion of the twice redirected optical signal incident at the end face 31, represented by ray 32, is reflected toward transition lens 20. The reflected optical signal is redirected by the right-facing convex surface of transition lens, as represented by ray 34, and redirected again, as shown by ray 36, when ray 34 encounters the interface between the left-facing surface of transition lens 20 and air. As described in further detail below, this reflected optical signal (i.e., ray 36) can be returned to the source 10. The ray 36 is received or incident at the emitter of the source 10 at an angle of incidence $\beta$ with respect to the common axis 7. As indicated in FIG. 1, the launch angle $\alpha$ of the emitted optical signal approximates the angle of incidence $\beta$ of the reflected portion of the optical signal. As also indicated in FIG. 1 transition lens 20 is implemented with a material that exhibits a one-way signal attenuation of about 5 dB to limit the amount of reflected optical signal power that is returned to source 10.

A multi-mode optical fiber is an often preferred optical waveguide for communication links in the range of about 1 to 300 meters. Today's electronics can effectively support desired data rates in excess of about 14 Gbps using vertical cavity surface emitting lasers (VCSELs) as the light source. VCSELs are often preferred by end-users because of their high coupling efficiency with optical fibers absent a beam shaping correction as is required by other light sources.

The communication standards for such communication links call for optical fibers with flat and polished end surfaces. In use, these optical fibers reflect about 4% of the incident light energy back toward the VCSEL. As illustrated in FIG. 1, the reflected optical signal can be coupled back into the VCSEL. Over relatively short separation distances between the VCSEL and the fiber end, the reflected signal is still coherent with the emitted optical signal. It is well known that such coherent feedback can lead to destabilization of the emitted optical signal. Destabilization of the optical signal can lead to an increase in data errors. In many conventional communication links, the VCSEL produces more light energy than the link requires. To ensure stable operation of the VCSEL optical attenuation is introduced via filters or absorptive lens materials. As the reflected optical signal is attenuated twice (i.e., once on the way to the fiber end and once after the reflection), the total power reflected back to the VCSEL is usually very small. For example, for a lens with 5 dB of attenuation over a single pass the reflected power that makes it back to the VCSEL is no more than 0.4% of the emitted optical signal power.

Based on the above, an increase in optical signal power can increase the susceptibility of the VCSEL to undesirable feedback from the reflected optical signal. In addition, a reduction in attenuation in the optical path would also increase the likelihood of coupling undesirable feedback into the VCSEL.

SUMMARY

An optical communication system includes a transceiver with a light source, a transition lens and an optical medium. Each of the light source, the transition lens and the optical medium has a corresponding axis. The light source generates an optical signal that has a normal axis. The transition lens has an optical axis. The optical medium has a longitudinal axis. A relative misalignment from a coaxial alignment of the corresponding axes of at least one of the light source, the transition lens and the optical medium is used to reduce a back reflection incident at the light source. Such misalignments can be achieved by one or both of angular adjustments and offsets of the axes in a controlled manner.

In an exemplary embodiment, an optical communication system includes a vertical cavity surface emitting laser (VCSEL), a transition lens, and an optical medium. The VCSEL generates an optical signal along a first optical axis, the optical signal having a launch angle with respect to the first optical axis. The transition lens is positioned to intercept the optical signal along the first optical axis and redirect the optical signal to generate a first redirected optical signal. The transition lens has a second optical axis. The optical medium is positioned to intercept the first redirected optical signal. The optical medium has an end surface that reflects at least a portion of the first redirected optical signal. The optical medium is positioned with respect to the transition lens such that a portion of the reflected optical signal is intercepted and redirected by the transition lens to generate a reflected and redirected optical signal. The transition lens further redirects the reflected and redirected optical signal toward the vertical cavity surface emitting laser. The twice redirected and reflected optical signal being intercepted by the vertical cavity surface emitting laser at a return angle with respect to the first optical axis. At least one of the first optical axis, the second optical axis and the longitudinal axis is askew from the remaining axes.

In another exemplary embodiment, an optical communication system includes a VCSEL, a transition lens, and an optical medium. The VCSEL generates an optical signal along a first optical axis, the optical signal having a launch angle with respect to the first optical axis. The transition lens is positioned to intercept the optical signal along the first optical axis and redirect the optical signal to generate a first redirected optical signal. The transition lens has a second optical axis. The optical medium is positioned to intercept the first redirected optical signal. The optical medium has an end surface that reflects at least a portion of the first redirected optical signal. The optical medium is positioned with respect to the transition lens such that a portion of the reflected optical signal is intercepted and redirected by the transition lens to generate a reflected and redirected optical signal. The transition lens further redirects the reflected and redirected optical signal toward the vertical cavity surface emitting laser. The twice redirected and reflected optical signal being intercepted by the vertical cavity surface emitting laser at a return angle with respect to the first optical axis. At least one of the first optical axis, the second optical axis and the longitudinal axis is offset from the remaining axes.

In another exemplary embodiment, a method for coupling an optical signal to a medium while minimizing back reflection into a light source is disclosed. The method includes the steps of providing a transceiver having an opto-electronic light source configured to emit an optical signal along a first optical axis, arranging a transition lens to intercept the optical signal along the first optical axis and redirect the optical signal to generate a first redirected optical signal, the transition lens having a second optical axis, arranging an optical medium to intercept the first redirected optical signal, the optical medium having a first end surface and a second end surface and a longitudinal axis, the first end surface reflecting a portion of the first redirected optical signal to generate a reflected optical signal, the optical medium positioned with respect to the transition lens such that a portion of the reflected optical signal is intercepted and redirected by the transition lens to generate a reflected and redirected optical signal, the transition lens further redirecting the reflected and redirected optical signal toward the vertical cavity surface emitting laser, the twice redirected and reflected optical signal being intercepted by the vertical cavity surface emitting laser at a return angle with respect to the first optical axis, selecting one of the first optical axis, the second optical axis and the longitudinal axis as a reference and adjusting the relative position of at least one of the axes not selected as the reference.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The optical communication system and method for minimizing reflective feedback into a light source can be better understood with reference to the following drawings. The components in the drawings are not necessarily to scale, emphasis instead being placed upon clearly illustrating the principles of the present invention.

DETAILED DESCRIPTION

The described issues with increasing data throughput by increasing data rates, while using VCSELs and a standard optical fiber, can be avoided by multiple solutions.

One potential solution is to introduce an angled end face on the fiber end. By introducing a small angle at the end face of the fiber, the resulting reflected optical signal will not be returned to the VCSEL through the coupling lens or will be incident at an angle of incidence that is very different than the launch angle. When the angle of incidence of the reflected optical signal is very different from the launch angle it is unlikely that the reflected optical signal would be returned to the cavity of the VCSEL where it could destabilize the optical signal. However, unless marked adapters with an appropriately angled fiber end and a non-angled or flat opposed end are provided to end users, it is likely that end users would damage angled fiber ends when they attempt to mate the same to optical connectors having protruding fibers with flat ends.

Another way to avoid reflective feedback is to apply a layer of anti-reflective coating material on an optical medium arranged in a jumper or adapter that connects to the transceiver module. However, unless the jumper or adapter is appropriately arranged and marked it is likely that some users would attempt to couple such a modified jumper or adapter to an optical connector with protruding fibers that are likely to permanently damage the anti-reflective coating.

Accordingly, the disclosed inventive systems and methods are presented as more suitable alternative solutions to avoid reflective feedback in a communication system using a VCSEL as a source and an optical fiber as the light medium.

As briefly introduced above, an optical communication system in accordance with the principles of the present invention includes a transceiver with a light source, a transition lens and an optical medium. Each of the light source, the transition lens and the optical medium has a corresponding axis. The light source generates an optical signal that has a normal axis. The transition lens has an optical axis. The optical medium has a longitudinal axis. A relative and controlled misalignment from a conventional coaxial alignment of the corresponding axes of at least one of the light source, the transition lens and the optical medium is used to reduce a back reflection incident at the light source. As will become apparent from the illustrated embodiments, such misalignments can be achieved by one or both of angular adjustments and/or offsets of the axes of the individual elements in a desired and controlled manner.

Figure 2:
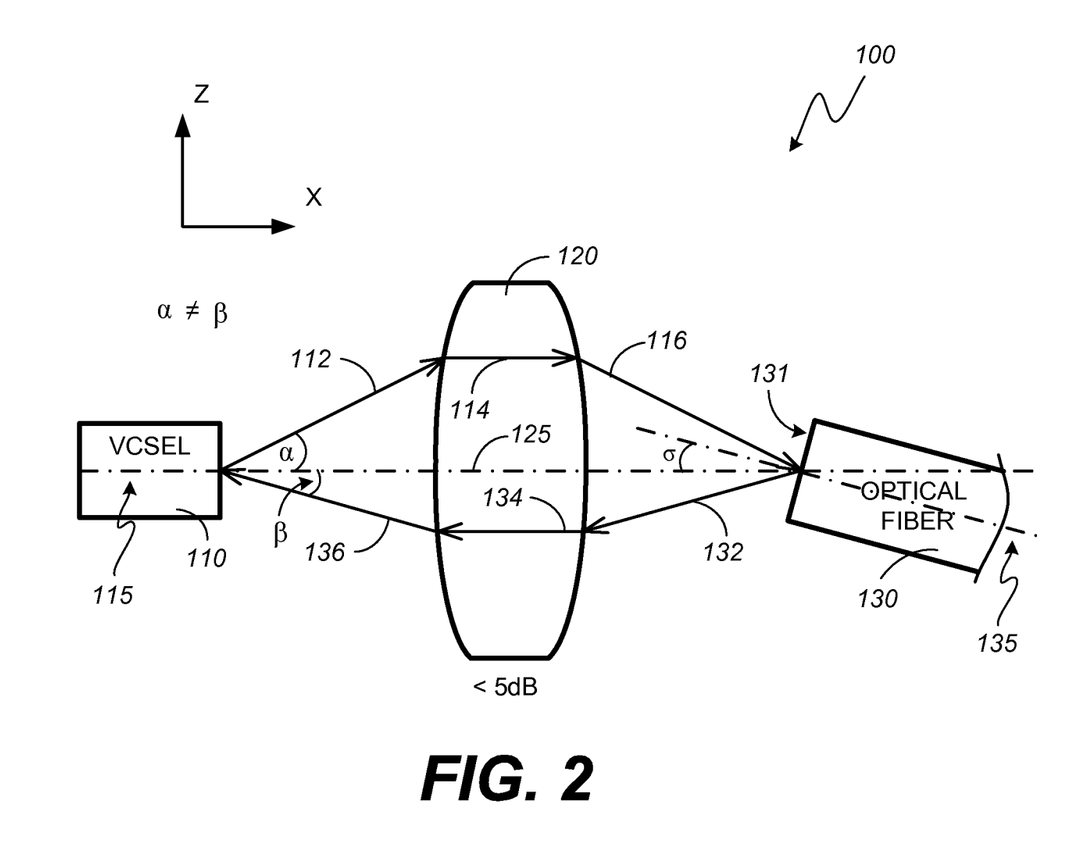
FIG. 2 is a schematic view of an optical communication system, in accordance with an exemplary embodiment of the invention.

FIG. 2 illustrates a first exemplary embodiment of an optical communication system 100. The optical communication system 100 includes VCSEL source 110, transition lens 120 and optical fiber 130 arranged generally along axis 125. In the illustrated arrangement, an optical axis 115 of the VCSEL source 110 and a respective optical axis 125 of the transition lens coincide, whereas the longitudinal axis 135 of the optical fiber 130 defines a non-zero angle σ with respect to the reference axis 125.

The transition lens 120, which can be made of glass or various plastic compounds, is arranged with a convex surface that faces the VCSEL source 110 and a convex surface that faces an end face 131 of the optical fiber 130. The transition lens 120 is separated from both VCSEL source 110 and the end face 131 of the optical fiber 130 by respective air gaps. These gaps create interfaces at which there is a mismatch between indexes of refraction. Consequently, such interfaces refract or redirect an incident optical signal.

In the illustrated embodiment the transition lens 120 is spherical. However, in alternative embodiments the transition lens 120 can be biconic or aspherical as may be desired. As indicated in FIG. 2, the transition lens 120 is made from a material that introduces less optical signal attenuation than the conventional transition lens 20 shown in FIG. 1.

As illustrated schematically in FIG. 2, the optical signal, as represented by ray 112, is emitted from the VCSEL source 110 in the direction of the transition lens 120. The ray 112 is emitted at a launch angle α with respect to the axis 115. Due to the difference in the index of refraction of air and the material used to produce the transition lens 120, which may be glass or plastic, when ray 112 reaches the left-facing convex surface of the transition lens 120, ray 112 is refracted (i.e., redirected). The redirected optical signal, represented by ray 114, is further redirected when it reaches the air gap between the right-facing convex surface of transition lens 120 and the end face 131 of the optical fiber 131. A portion of the twice redirected optical signal, represented by ray 116, incident at the end face 131 enters the optical fiber 130, which conveys the optical signal to an opposed end of the optical medium (not shown).

As further shown schematically in FIG. 2, a remaining portion of the twice redirected optical signal incident at the end face 131, represented by ray 132, is reflected toward transition lens 120. The reflected optical signal is redirected by the right-facing convex surface of transition lens 120, as represented by ray 134, and redirected again, as shown by ray 136, when ray 134 encounters the interface between the left-facing surface of transition lens 120 and air. This reflected optical signal (i.e., ray 136) returns to the emitting surface of the VCSEL source 110. However, ray 136 is received or incident at the emitter of the VCSEL source 110 at an angle of incidence β or return angle with respect to the axis 115 that is different from the launch angle α of the emitted optical signal. When the launch angle α is different from the angle of incidence β of the reflected optical signal, it is unlikely that the reflected optical signal will return to the active cavity of the VCSEL source 110.

The embodiment illustrated schematically in FIG. 2, is representative of an angular adjustment (in the X-Z plane) of one of the respective axes of the VCSEL source 110, the transition lens 120 and the optical fiber 130. Stated another way, at least one of the corresponding axes associated with one of the elements is askew from the axes associated with the remaining elements. That is, one of the elements has an axis that is not coaxial with the other elements. It should be understood that a corresponding controlled angular adjustment in the positive or negative Z-direction of either or both of the VCSEL source 110 and the transition lens 120 can be implemented along with the illustrated adjustment of the longitudinal axis 135 of the optical fiber 130 can be implemented by those skilled in the art to reduce or eliminate the likelihood of a destabilizing coupling of a reflected optical signal at the VCSEL source 110. Stated another way, any one of VCSEL source 110, transition lens 120, and the optical fiber 130 can be manipulated in the X-Z plane to reduce the likelihood of a signal destructive feedback of a reflected portion of the optical signal to the VCSEL source 110. Furthermore, any two of the VCSEL source 110, transition lens 120, and the optical fiber 130 can be manipulated in the X-Z plane to reduce the likelihood of destabilizing feedback introduced by a reflected portion of the optical signal. Moreover, each of the VCSEL source 110, transition lens 120, and the optical fiber 130 can be manipulated in the X-Z plane to reduce the likelihood of destabilizing feedback.

Figure 3:
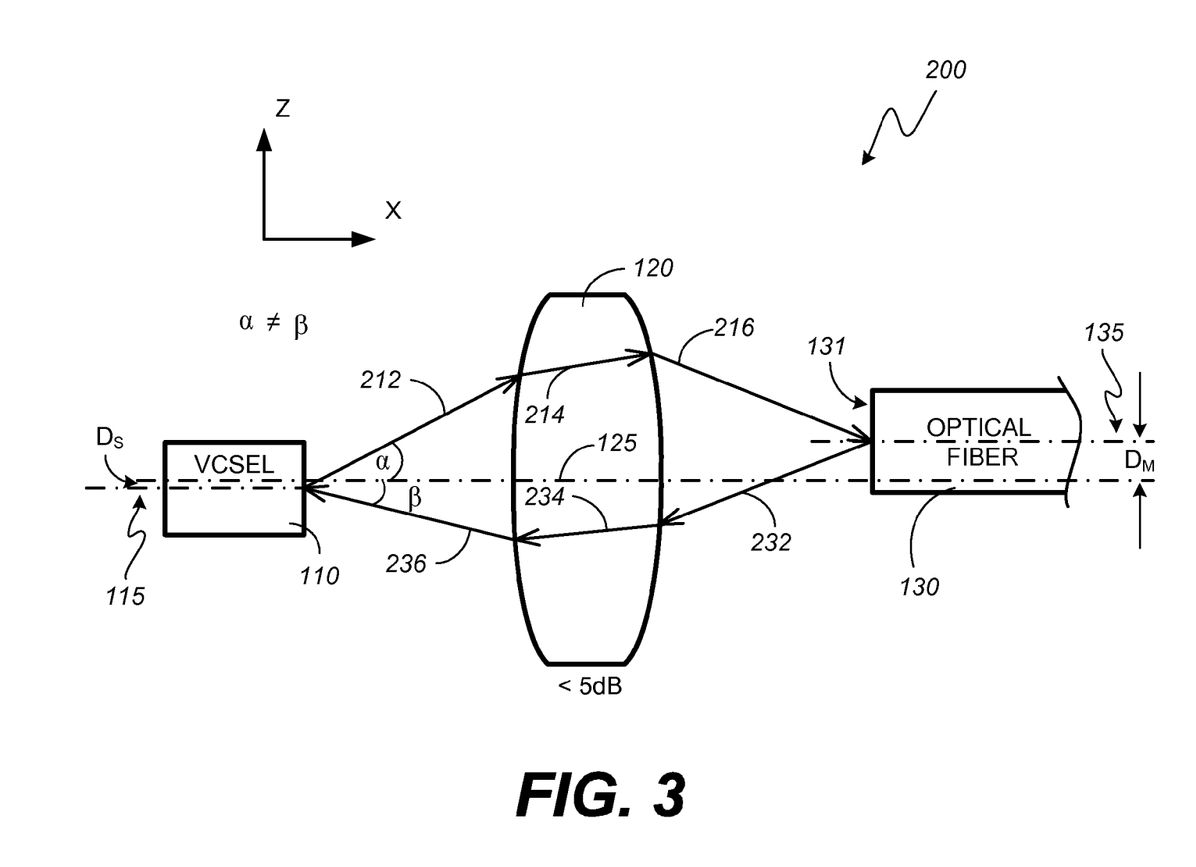
FIG. 3 is a schematic view of an alternative optical communication system, in accordance with an exemplary embodiment of the invention.

FIG. 3 is a schematic view of an alternative optical communication system 200, in accordance with an exemplary embodiment of the invention. As illustrated, the optical communication system 200 includes VCSEL source 110, transition lens 120 and optical fiber 130 arranged generally along axis 125. In the illustrated arrangement, an optical axis 115 of the VCSEL source 110 is shifted or offset in the negative Z-direction by a distance $D_S$ from the axis 125 of the lens 120. As further illustrated, the longitudinal axis 135 of the optical fiber 130 is shifted or offset in the positive Z-direction by a distance $D_M$ from the axis 125.

The transition lens 120 is arranged with a convex surface that faces the VCSEL source 110 and a convex surface that faces an end face 131 of the optical fiber 130. The transition lens 120 is separated from both VCSEL source 110 and the end face 131 of the optical fiber 130 by respective air gaps. These gaps create interfaces at which there is a mismatch between indexes of refraction. Consequently, such interfaces refract or redirect an incident optical signal.

In the illustrated embodiment the transition lens 120 is spherical. In alternative embodiments (not shown) the transition lens 120 can be biconic or aspherical as may be desired. As indicated in FIG. 3, the transition lens 120 is made from a material that introduces less optical signal attenuation than the conventional transition lens 20 shown in FIG. 1.

As illustrated schematically in FIG. 3, the optical signal, as represented by ray 212, is emitted from the VCSEL source 110 in the direction of the transition lens 120. The ray 212 is emitted at a launch angle α with respect to the axis 115. Due to the difference in the index of refraction of air and the material used to produce the transition lens 120, which may be glass or plastic, when ray 212 reaches the left-facing convex surface of the transition lens 120, ray 212 is refracted (i.e., redirected). The redirected optical signal, represented by ray 214, is further redirected when it reaches the air gap between the right-facing convex surface of transition lens 120 and the end face 131 of the optical fiber 130. A portion of the twice redirected optical signal, represented by ray 216, incident at the end face 131 enters the optical fiber 130, which conveys the optical signal to an opposed end of the optical fiber 130 (not shown).

As further shown schematically in FIG. 3, a remaining portion of the twice redirected optical signal incident at the end face 131, represented by ray 232, is reflected toward transition lens 120. The reflected optical signal is redirected by the right-facing convex surface of transition lens 120, as represented by ray 234, and redirected again, as shown by ray 236, when ray 234 encounters the interface between the left-facing surface of transition lens 120 and air. This reflected optical signal (i.e., ray 236) returns to the emitting surface of the VCSEL source 110. However, ray 236 is received or incident at the emitter of the VCSEL source 110 at an angle of incidence β with respect to the axis 115 that is different from the launch angle α of the emitted optical signal. As indicated above, when the launch angle α is different from the angle of incidence β of the reflected optical signal, it is unlikely that the reflected optical signal will return to the active cavity of the VCSEL source 110.

The embodiment illustrated schematically in FIG. 3, is representative of an offset or shift of the respective axes of the VCSEL source 110 (i.e., the optical axis 115) and the longitudinal axis 135 of the optical fiber 130. It should be understood that a corresponding controlled offset or shift in the positive or negative Z-direction of the transition lens 120 can be implemented along with the illustrated offsets or shifts of the VCSEL source 110 and the optical fiber 130 by those skilled in the art to reduce or eliminate the likelihood of a destabilizing coupling of a reflected optical signal at the VCSEL source 110. It should further be understood that any one of VCSEL source 110, transition lens 120, and the optical fiber 130 can be offset or shifted in the positive or negative Z-direction to reduce the likelihood of destructive feedback of a reflected portion of the optical signal, while arranging the remaining devices such that their corresponding axis is coaxial to or in alignment with axis 125. Moreover, each of the VCSEL source 110, transition lens 120, and the optical fiber 130 can be offset or shifted in the Z-direction to reduce the likelihood of destabilizing feedback.

Figure 4A:
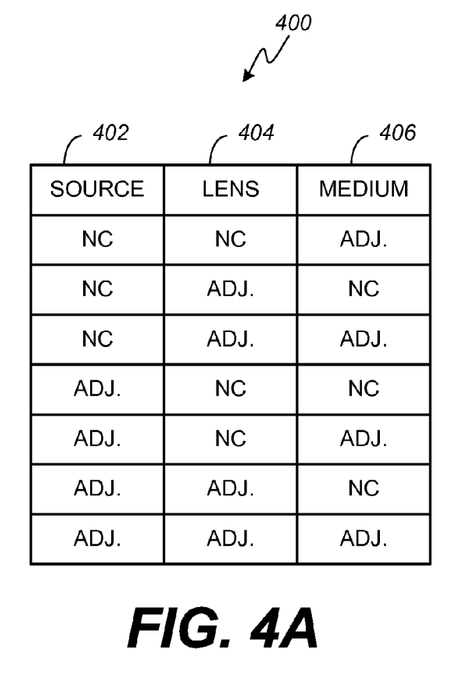
FIGS. 4A-4C include respective tables showing representative descriptions of alternative embodiments of the invention.
Figure 4B:
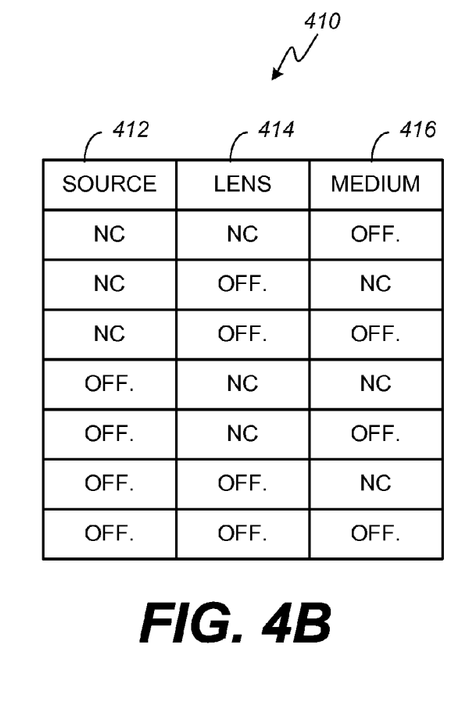
Figure 4C:
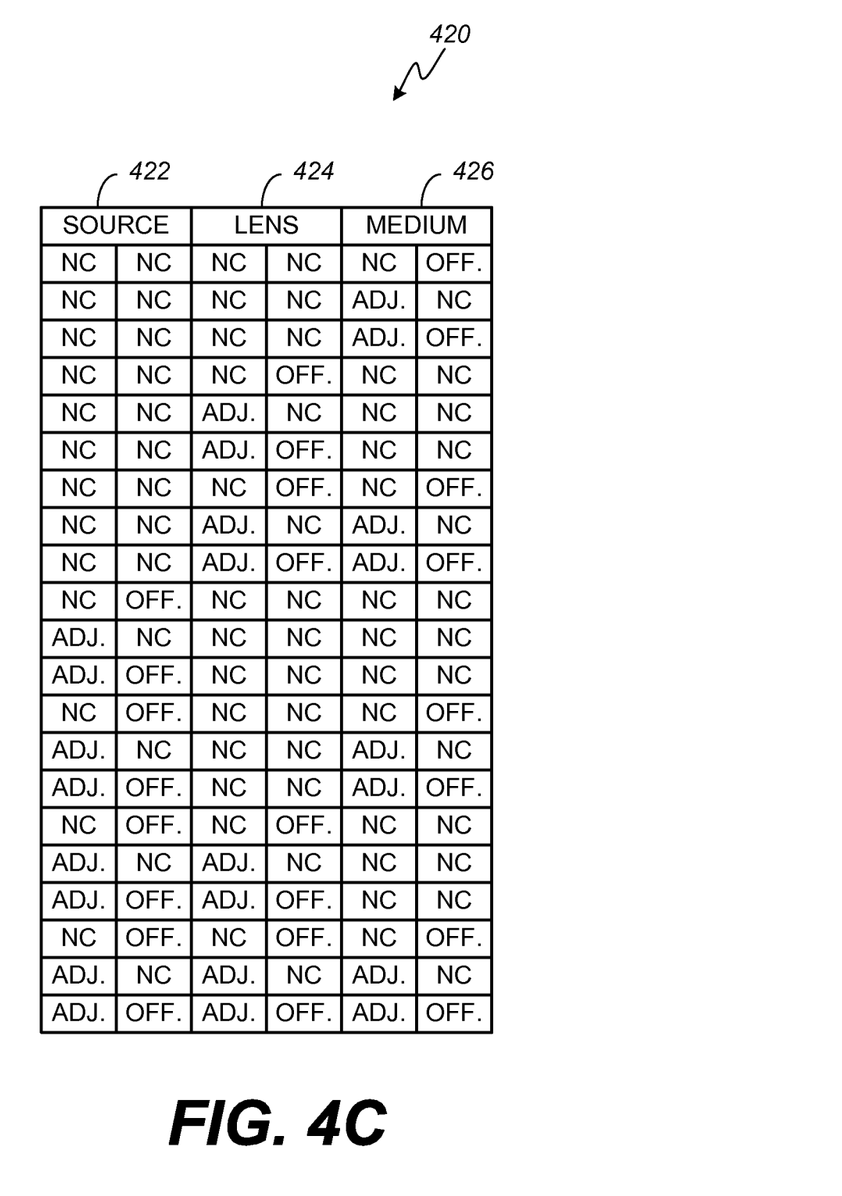

FIGS. 4A-4C include respective tables showing representative descriptions of alternative embodiments of the invention. Table 400 includes respective columns for each element in the example optical communication system introduced in FIG. 2. The respective columns include a condition or state of the corresponding axis associated with the element with respect to the reference axis 125. Column 402, labeled "Source" includes a series of entries that include the state of the optical axis of the VCSEL 110 (FIG. 2). Column 404, labeled "Lens" includes a series of entries that include the state of the optical axis of the Lens 120 (FIG. 2). Column 406, labeled "Fiber" includes a series of entries that include the state of the longitudinal axis 135 of the optical fiber 130 (FIG. 2). The table 400 illustrated in FIG. 4A includes various arrangements of the axes associated with the respective elements when only an angular adjustment is made. The label, "NC" is indicative of no change (i.e., no angular adjustment) to the axis associated with a corresponding element. In contrast, the label "ADJ." is indicative of an angular adjustment of the axis associated with a corresponding element. For example, the first row of FIG. 4A defines a system where the longitudinal axis 135 of the optical fiber 130 is controllably adjusted, as described above with respect to the embodiment illustrated in FIG. 2. The remaining rows of table 400 define alternative systems consistent with the present inventive principles for reducing or avoiding reflective feedback.

It should be understood that the particular angular adjustment shown in FIG. 2, i.e., an angle between the reference axis 125 and the longitudinal axis 135 in the positive Z-direction, is by way of example only. Contemplated angular adjustments of the respective axis of each of the VCSEL 110, transition lens 120 and the optical fiber 130 would result in angles between the respective axis and the reference axis 125 (FIG. 2) that are both positive and negative in both the Y-direction and angles between the respective axis and the reference axis 125 (FIG. 2) that are both positive and negative in the Z-direction.

Table 410 includes respective columns for each element in the example optical communication systems introduced in FIG. 3. The respective columns include a condition or state of the corresponding axis associated with the element with respect to the reference axis 125. Column 412, labeled "Source" includes a series of entries that include the state of the optical axis of the VCSEL 110 (FIG. 3). Column 414, labeled "Lens" includes a series of entries that include the state of the optical axis of the Lens 120 (FIG. 3). Column 416, labeled "Fiber" includes a series of entries that include the state of the longitudinal axis 135 of the optical fiber 130 (FIG. 3). The table 410 illustrated in FIG. 4B includes various arrangements of the axes associated with the respective elements when only a positional offset is made. The label, "NC" is indicative of no change (i.e., no positional offset) to the axis associated with a corresponding element. In contrast, the label "OFF." is indicative of an offset of the axis associated with a corresponding element. For example, the fifth row from the top of FIG. 4B defines a system where the optical axis 115 of the VCSEL 110 and the longitudinal axis 135 of the optical fiber 130 are both controllably offset, as described above with respect to the embodiment illustrated in FIG. 3. The remaining rows of table 410 define alternative systems consistent with the present inventive principles for reducing or avoiding reflective feedback.

It should be understood that the particular offset positions shown in FIG. 3, i.e., a shift in the optical axis 115 in the negative Z-direction with respect to the reference axis 125 and a shift in the longitudinal axis 135 of the optical fiber 130 in the negative Z-direction, are by way of example only. Contemplated positional offsets of the respective axis of each of the VCSEL 110, transition lens 120 and the optical fiber 130 can be made that result in shifts in both the positive and negative Y-direction as well.

Table 420 includes respective columns for each element in the example optical communication systems introduced in FIG. 2 and FIG. 3. The respective columns include two conditions or states of the corresponding axis associated with the element with respect to the reference axis 125. Column 422, labeled "Source" includes a series of entries that include states or conditions of the optical axis of the VCSEL 110. Column 424, labeled "Lens" includes a series of entries that include states or conditions of the optical axis of the Lens 120. Column 426, labeled "Fiber" includes a series of entries that include states of the longitudinal axis 135 of the optical fiber 130. The table 420 illustrated in FIG. 4C includes various arrangements of the axes associated with the respective elements when both an angular adjustment and a positional offset are made. The label, "NC" is indicative of no change (i.e., no positional offset or angular adjustment) to the axis associated with a corresponding element. The label "OFF." is indicative of an offset of the axis associated with a corresponding element. The label "ADJ." is indicative of an angular adjustment of the axis associated with a corresponding element. For example, the third row from the top of FIG. 4C defines a system where the longitudinal axis 135 of the optical fiber 130 is both controllably offset and angularly adjusted, as described separately above with respect to the embodiments illustrated in FIG. 2 and in FIG. 3. The remaining rows of table 420 define alternative systems consistent with the present inventive principles for reducing or avoiding reflective feedback.

Figure 5:
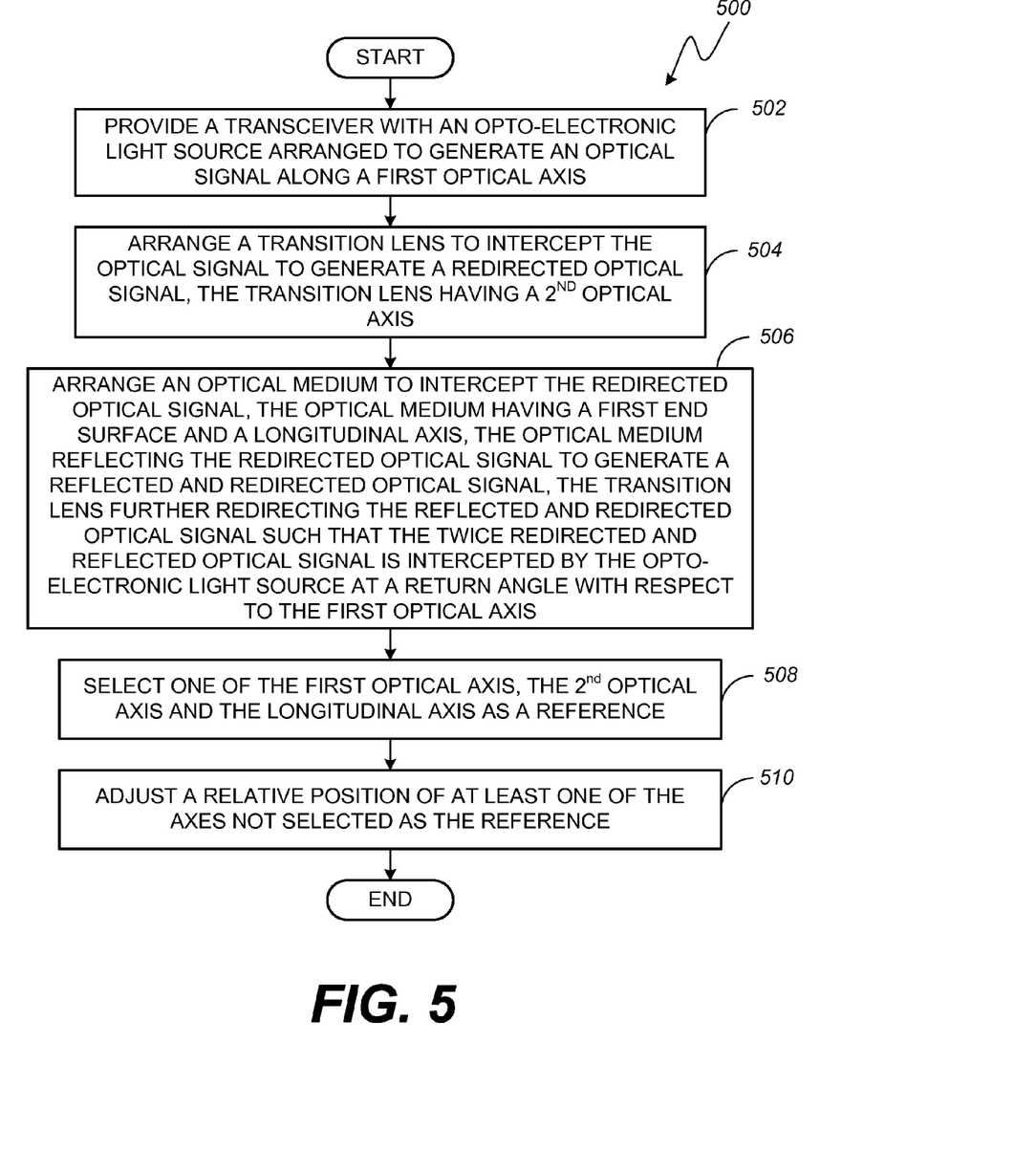
FIG. 5 is a flow diagram illustrating a method for minimizing reflective feedback.

FIG. 5 is a flow diagram illustrating a method 500 for minimizing reflective feedback. Method 500 begins with block 502 where a transceiver with an opto-electronic light source is provided. As explained above, the opto-electronic light source can be implemented with a VCSEL, such as the VCSEL 110. The VCSEL 110 generates an optical signal that is transmitted in a direction normal to the emitting surface of the VCSEL 110 along a first optical axis. In block 504, a transition lens is arranged to intercept the optical signal. The transition lens has a second optical axis. As also explained above, the transition lens redirects the incident optical signal due to differences in the index of refraction of air and the material used to produce the transition lens.

In block 506, an optical medium is arranged to intercept the redirected optical signal. The optical medium has a longitudinal axis. A first portion of the redirected optical signal incident on an end face of the optical medium is conveyed to an opposed end of the optical medium. A second portion of the redirected optical signal is reflected from the end face of the optical medium back toward the transition lens. As further indicated in block 506, the transition lens further redirects the reflected optical signal such that the reflected and redirected optical signal is intercepted by the opto-electronic light source at a return angle with respect to the first optical axis.

As explained above, the optical medium can be a multimode optical fiber suitable for supporting communication over link lengths of up to about 300 m for signals operating at a data rate of 10 Gbit/s or more. For example, the optical medium can be a multimode fiber in accordance with the OM3 or OM4 classifications identified in the ISO 11801 standard.

In block 508, one of the first optical axis, the second optical axis and the longitudinal axis is selected as a reference. Next, as indicated in block 510, a relative position of at least one of the axes not selected as the reference is controllably adjusted. As indicated above, both angular adjustments and a positional offset of one or more of the first optical axis, the second optical axis and the longitudinal axis of the optical medium are possible. By introducing one or more controlled adjustments of the optical axis of the opto-electronic light source, the optical axis of the transition lens and the longitudinal axis of the optical medium, the likelihood that a reflected optical signal will return to the light source and adversely affect the stability of the optical signal can be reduced even when a transition lens having a reduced attenuation at the wavelength of the optical signal is used.

In an alternative embodiment of the method for minimizing or reducing reflective feedback, the function associated with block 508 can be replaced with selecting or defining a reference axis. When this is the case, the function associated with block 510 can be replaced by a adjusting the relative position of at least one of the first optical axis (i.e., the opto-electronic light source), the second optical axis (i.e., the transition lens), and the longitudinal axis of the optical medium with respect to the reference axis.

One or more illustrative or exemplary embodiments of optical communication systems and methods for minimizing reflective feedback have been described above. However, it is to be understood that the systems and methods are defined by the appended claims and are not limited to the specific embodiments described.

What is claimed is:

1. An optical communication system, comprising:
   an emitter that generates an optical signal along a first optical axis, the optical signal having a launch angle with respect to the first optical axis;
   a transition lens positioned to intercept the optical signal along the first optical axis and twice redirect the optical signal to generate a twice redirected optical signal, the transition lens having a second optical axis, parallel to the first optical axis; and
   an optical medium positioned to intercept the twice redirected optical signal, the optical medium having an end surface and a longitudinal axis, parallel to the first optical axis and the second optical axis, the end surface reflecting a portion of the twice redirected optical signal to generate a reflected optical signal, the optical medium positioned with respect to the transition lens such that a portion of the reflected optical signal is intercepted and twice redirected by the transition lens to generate a reflected and twice redirected optical signal toward the vertical cavity surface emitting laser, the reflected and twice redirected optical signal being intercepted by the emitter at a return angle with respect to the first optical axis, the reflected and twice redirected optical signal intersecting the first optical axis proximal to the emitter, at least one of the first optical axis, the second optical axis and the longitudinal axis being offset from the remaining axes.

2. The optical communication system of claim 1, wherein the launch angle is different than the return angle.

3. The optical communication system of claim 1, wherein the optical medium is a multimode fiber.

4. The optical communication system of claim 1, wherein the transition lens is biconic.

5. The optical communication system of claim 1, wherein the transition lens is aspherical.

6. The optical communication system of claim 1, wherein the first optical axis is offset from the second optical axis and the longitudinal axis.

7. The optical communication system of claim 1, wherein at least two of the first optical axis, the second optical axis and the longitudinal axis are offset from the remaining axis.

8. The optical communication system of claim 1, wherein the optical medium is a fiber.

9. The optical communication system of claim 1, wherein the end surface is polished.

10. The optical communication system of claim 1, wherein at least two of the first optical axis, the second optical axis and the longitudinal axis are offset from the remaining axis.

11. The optical communication system of claim 1, wherein the emitter is a laser.

12. The optical communication system of claim 11, wherein the laser is vertical cavity surface emitting laser.

13. The optical communication system of claim 1, wherein the transition lens redirects the optical signal along a first redirected optical axis.

14. The optical communication system of claim 1, wherein the transition lens redirects the reflected optical signal along a third redirected optical axis.

15. The optical communication system of claim 1, wherein the transition lens redirects the optical signal and redirects the reflected optical signal in opposing directions.

16. The optical communication system of claim 15, wherein a redirected optical signal and a redirected reflected signal are parallel to one another within the transition lens.

17. A method for coupling an optical signal to a medium while minimizing back reflection into a light source, the method comprising:
   providing a transceiver having a vertical cavity surface emitting laser configured to emit an optical signal along a first optical axis, the optical signal having a launch angle with respect to the first optical axis;
   arranging a transition lens to intercept the optical signal along the first optical axis and twice redirect the optical signal to generate a twice redirected optical signal, the transition lens having a second optical axis parallel to the first optical axis;
   arranging an optical medium to intercept the twice redirected optical signal, the optical medium having an end surface and a longitudinal axis, the end surface reflecting a portion of the twice redirected optical signal to generate a reflected optical signal, the optical medium positioned with respect to the transition lens such that a portion of the reflected optical signal is intercepted and twice redirected by the transition lens to generate a reflected and twice redirected optical signal toward the vertical cavity surface emitting laser, the reflected and twice redirected optical signal being intercepted by the vertical cavity surface emitting laser at a return angle with respect to the first optical axis, the reflected and twice redirected optical signal intersecting the first optical axis proximal to the emitter;

selecting one of the first optical axis, the second optical axis and the longitudinal axis as a reference; and adjusting the relative position of at least one of the axes not selected as the reference with respect to the reference.

18. The method for minimizing back reflection into a light source of claim 17, wherein adjusting the relative position of at least one of the axes not selected as the reference includes offsetting the at least one of the axes.

19. The method for minimizing back reflection into a light source of claim 17, wherein adjusting the relative position of at least one of the axes not selected as the reference includes offsetting the remaining axes.

20. The method for minimizing back reflection into a light source of claim 17, wherein the launch angle is less than the return angle.

\* \* \* \* \*